July 13, 1937.  R. E. LEWIS  2,086,564
CHANGE SPEED TRANSMISSION
Filed March 29, 1935  4 Sheets-Sheet 2
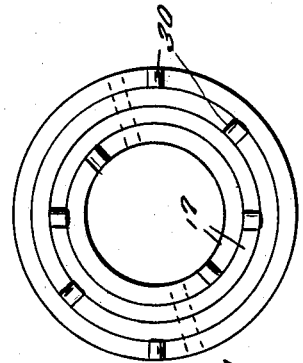
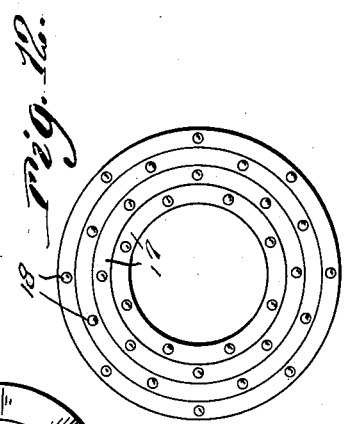
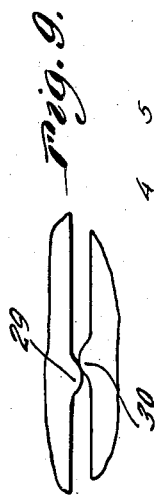
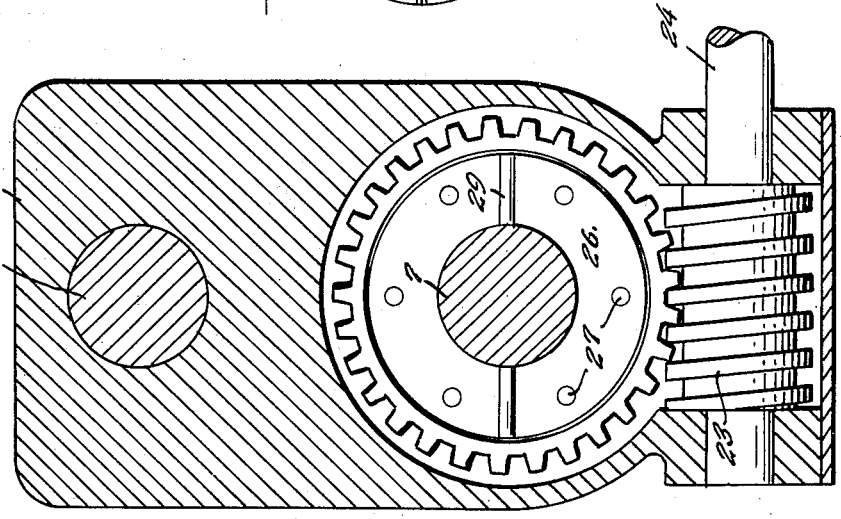
Inventor
R. E. Lewis
By Clarence A. O'Brien
Attorney

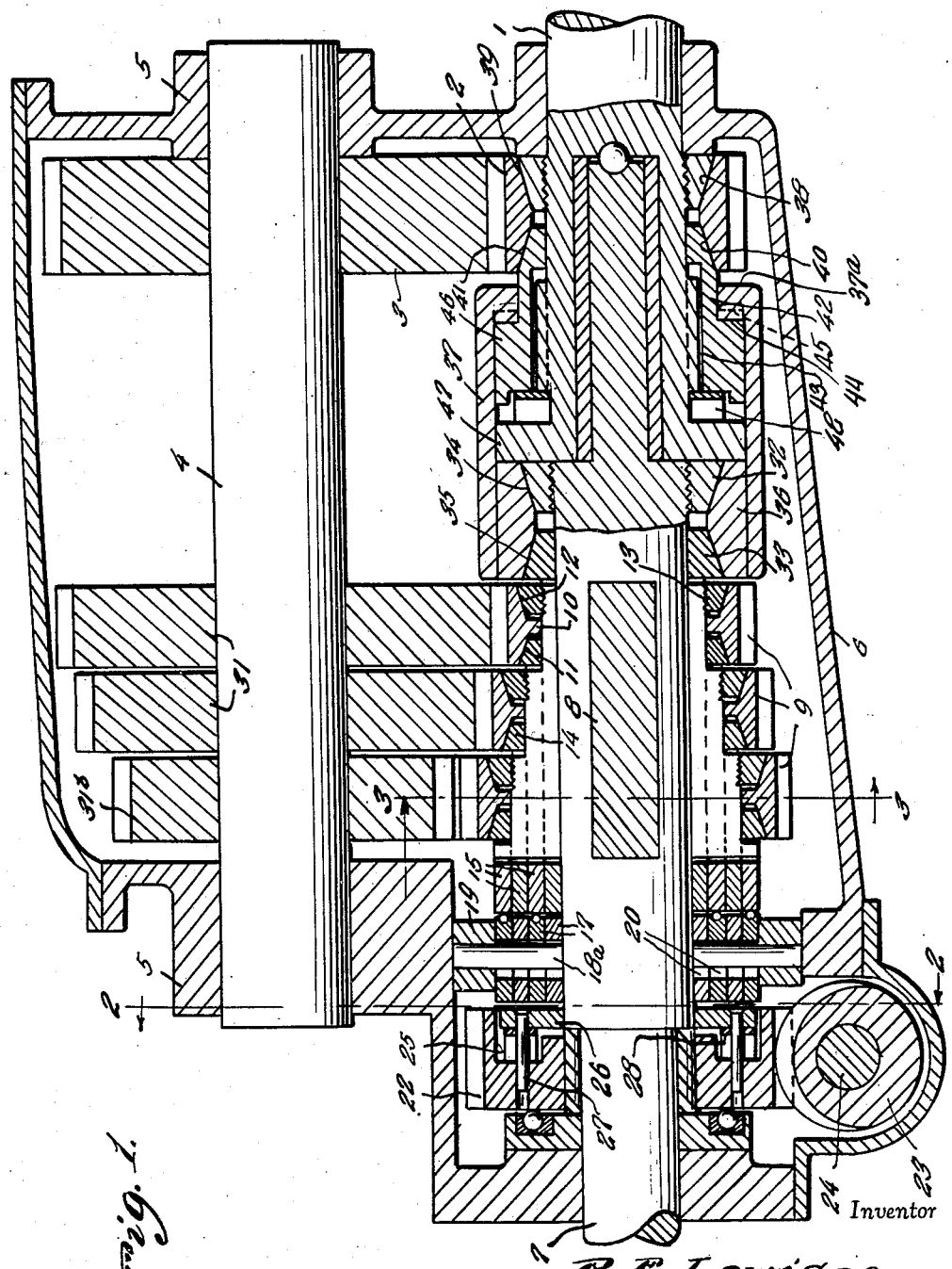

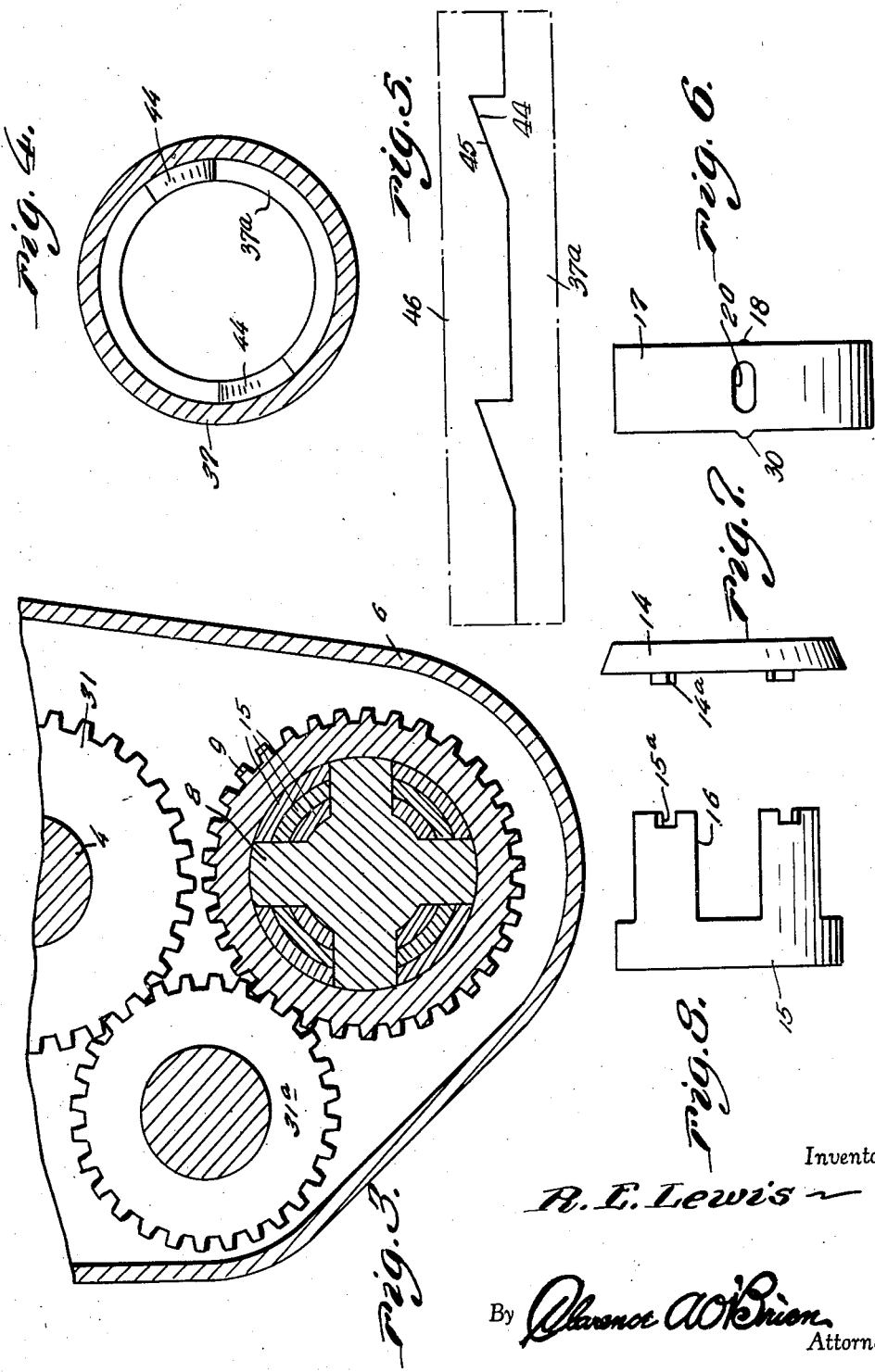

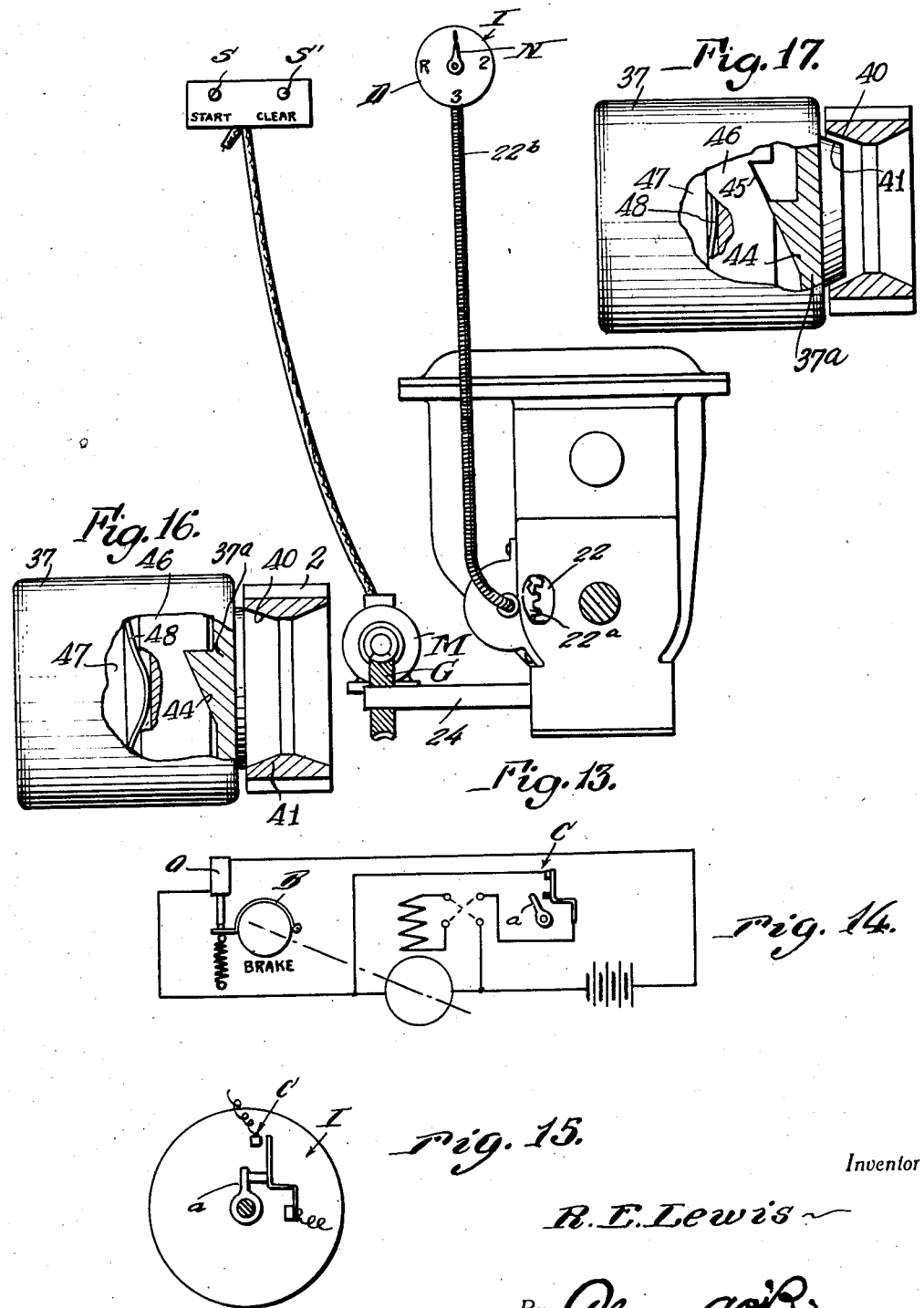

Patented July 13, 1937

2,086,564

UNITED STATES PATENT OFFICE 2,086,564

CHANGE SPEED TRANSMISSION

Robert E. Lewis, Hopewell, Va., assignor of eighteen and one-ninth per cent to Ollie Reese, thirteen and four-ninths per cent to Aaron F. Walker, thirteen and four-ninths per cent to Frank A. Walker, and thirteen and four-ninths per cent to Gould C. McIntyre, all of Hopewell, Va.

Application March 29, 1935, Serial No. 13,742

5 Claims. (Cl. 74—372)

This invention relates to change speed transmissions and an object of the invention is to provide such a transmission which may be used on lathes, automobiles, or wherever driving and driven shaftings are employed.

An object of the invention is the provision of a speed changing device in which, by a system of gears and clutches, the uniform speed of the driving shaft is transformed into a variable speed for the driven shaft and further to provide such a mechanism whereby speed changing without gear shifting may be accomplished.

The present invention involves certain new and useful improvements over the change speed transmission embodying the subject matter of my co-pending application Serial No. 758,811 entitled "Change speed transmission" and filed by me under date of December 22, 1934.

The present invention is concerned particularly with an improved direct drive connection between the driving and driven shaft of the improved transmission.

The invention together with its objects and advantages will be best understood from a study of the following description taken in connection with the accompanying drawings wherein:

Figure 1 is a detail view partly in section and partly in elevation illustrating an application of the invention.

Figures 2 and 3 are detail views taken substantially on the line 2—2 and 3—3 respectively of Figure 1.

Figure 4 is a detail sectional view through a sleeve forming part of a clutch mechanism and showing the cam humps in one end of the sleeve.

Figure 5 is a somewhat diagrammatic view of the cam.

Figure 6 is an elevational view of one of the concentric rings hereinafter more fully referred to.

Figure 7 is an edge elevational view of a shiftable clutch member.

Figure 8 is an elevational view of a shifting sleeve.

Figure 9 is a detail plan view showing cam means for effecting a shifting of the ring members.

Figure 10 is an end elevational view of a series of concentric rings.

Figure 11 is an elevational view of an annular spring.

Figure 12 is an elevational view of the rings showing the end thereof opposite to that shown in Figure 10.

Figure 13 is a view illustrating, somewhat diagrammatically, an indicator and motor control.

Figure 14 is a wiring diagram.

Figure 15 is a rear elevation of the indicator.

Figure 16 is a fragmentary view partly in section and partly in elevation showing a clutch assembly forming a salient feature of the invention, and with the parts in position interrupting direct drive between the driving and driven shafts, and Figure 17 is a view similar to Figure 16 with the parts in position providing a direct drive between the driving and driven shafts.

Refering to the drawings by reference numerals it will be seen that the numeral 1 designates the driving shaft, which may be the shaft that leads to a conventional form of internal combustion engine, and which in the present instance is provided with a high speed gear 2 in constant mesh with the gear 3 on the counter shaft 4. The counter shaft 4 is rotatably mounted in bearings 5 of a transmission casing 6.

Disposal in axial alignment with the driving shaft 1 is a driven shaft 7 which in the present instance may be the propeller shaft of an automobile. This shaft 7 has one end journaled in the gear equipped end of the shaft 1 as shown in Figure 1.

The shaft 7, within the case 6 is provided with a series of ribs 8 that project radially therefrom, and as best shown in Figure 1, these ribs 8 are stepped to accommodate a plurality of speed gears 9.

Each gear 9 is provided with an internal central rib 10, and also, internally with tapered clutch surfaces 11 and 12 on opposite sides of the rib 10. Cooperable with the clutch faces 12 of the gears 9 are fixed clutch members 13 that are threadedly engaged with the steps of the ribs 8 as shown in Figure 1.

Cooperable with the clutch surfaces 11 of the gears 9 are clutch members 14 that are somewhat similar to the clutch members 13 but which are slidably supported by the ribs 8 to move into and out of frictional engagement with the faces 11 of the gears 9 so as to control the placing of said gears 9 into and out of driving engagement with the shaft 7.

For shifting the clutch elemnts 14, there is provided a concentric series of tubular members 15 that are graduated in length, progressively decreasing in length from the inner to the outer end of said members 15.

The tubular members 15 are provided as clearly shown in Figure 8 with longitudinal slots 16 that accommodate the ribs 8 and also, at the ends thereof engaging the clutch disks 14, said members 15 are provided with notches 15a engaging lugs 14a on the clutch members 14 as clearly suggested in Figures 7 and 8, to prevent angular slippage between the members 14 and 15.

For successively shifting the members 15 there is provided a series of concentric rings 17 disposed concentrically of the shaft 7. These rings are provided at one end with balls 18 and at said end engage the adjacent ends of the tubular shifting members 15. At the ends thereof, opposite to the balls 18 the rings 17 are provided, each, with a pair of diametrically opposed cam humps 30 with which is cooperable a diametrically extending rib 29 provided on one face of a disk 26 carried by a gear 22 mounted in one end of the casing 6. The gear 22 is provided with a recess 25 outwardly from which is normally projected the disk 26 slidable on suitable pins 27, and urged outwardly with respect to the recess through the medium of an annular corrugated spring 28.

For driving the gear 22 in a manner to provide for the shifting of the slidable clutch members into and out of engagement with the respective ring gears, there is provided a worm 23 on a shaft 24 adapted to be driven from any suitable source of power, preferably an electric reversible motor M.

The aforementioned rings 17 are limited in their axial movement relative to one another through the medium of fixed pins 18a that extend inwardly toward the shaft 7 from a fixed annular frame 19 mounted within the casing 6 in any suitable manner and as suggested in Figure 1. These pins extend through aligned slots 20 provided in the members 17 as shown in Figures 1 and 6.

It will be understood, and as shown, that gears 9 are in constant mesh with speed gears 31 on the countershaft 4 for rotation therewith, and one of the gears 9 will serve as a reversing gear and will be in mesh with an idler pinion 31a that is in constant mesh with the gear 31b provided on the countershaft 4.

It will thus be seen that provision is made for both forward and reverse speed, and that a transition from one speed to another is gradual and takes place as the speed, in the case of an automobile, is increased or reduced. It will also be apparent that with such a transmission the speed will be consecutively stepped from low to high speed and vice versa, and that the speed changing is effected without the shifting of any gears.

As is thought to be apparent, with any gear 9 placed in driving engagement with the shaft 7, the transmission of power from shaft 1 is through the gear 2 held in driving engagement with shaft 1 in a manner hereinafter made manifest, the gear 3 and the gear 31 that is in mesh with the gear 9 placed in driving engagement with the shaft 7.

In accordance with the present invention, improved means is provided for placing shafts 1 and 7 in direct driving connection and to this end there is threaded on the shaft 7 as clearly shown in Figure 1, a substantially frusto-conical clutch disk 32. Slidable on the shaft 7 is a clutch disk 33 corresponding somewhat to the clutch disk 11 and the clutch disks 32 and 33 cooperate with clutch surfaces 34, 35 provided internally of a clutch ring 36 fixedly secured in any suitable manner within one end of a clutch sleeve 37.

A substantially frusto-conical clutch member 38 is threaded onto the shaft 1 and cooperates with a clutch face or surface 39 provided internally of the gear 2. A suitable clutch member 40 is provided to cooperate with a clutch surface 41 provided internally of the gear 2 and the clutch member 40 is formed integrally with a tubular or cylindrical body 42 slidably splined to the shaft 1 for rotation with the shaft and for axial movement relative to the shaft as at 43.

At its free end, the clutch sleeve 37 is provided with an inturned flange 37a formed on its inner face with cam humps 44 as shown in Figure 4. The cam humps 44 are cooperable with cam notches 45 provided in one face of a shoulder 46 formed integrally with the sleeve 42. Interposed between the rear face of the shoulder 46 and fixed collar 47 on the shaft 1 is an annular corrugated spring 48 of the type shown in Figure 11 and which normally serves to project the clutch member 40 into engagement with the clutch face 41 of the gear 2 to place the gear 2 in driving engagement with the shaft 1, so that normally, and as before stated, drive from the shaft 1 is transmitted through the gears 2 and 3 and from a gear 31 to that gear 9 with which the particular gear 31 is in mesh, and which gear 9 is in turn in driving engagement with the shaft 7 through the mechanism hereinbefore described in detail.

When it is desired to place the shafts 1 and 7 in direct driving engagement with one another, the innermost sleeve 15 is shifted to the right in Figure 1 to engage the clutch member 33 with the clutch face 35 thus placing the clutch sleeve 37 in driving engagement with the shaft 7. The clutch sleeve 37 thus rotating with the shaft 7 will, through the medium of the cam humps 44 passing out of the cam notches 45 in the shoulder 46, cause the member 41 to move toward the left in Figure 1 thus releasing the gear 2 so that the latter will idle and the drive will then be transmitted directly from shaft 1 to shaft 7. The operation of the transmission may be briefly described as follows:

When, for example, it is desired to place shafts 1 and 7 in direct driving engagement with one another the operator closes the switch S which may be conveniently mounted at a point near or remote from the motor M. The closing of the switch S will complete the circuit through the motor M and an electromagnetic brake operating device O for releasing the motor brake B thereupon setting the motor M in operation.

Drive from the motor M is transmitted through suitable gearing G to shaft 24. As before stated, power from shaft 24 is transmitted to the gear 22 for rotating the disk 26.

When the alined ribs 29 on the disk 26 come into engagement with the alined projections 30 on the innermost ring 17 the latter will be caused to move toward the right in Figure 1. Thus the innermost ring 17 is moved axially to engage and transmit corresponding movement to the innermost tubular member 15. The innermost tubular member 15, in turn, is thereby caused to engage clutch element 33, by urging the same toward the right in Figure 1, with the integral clutch part 36 of the member 37. Clutch 33 being thus placed in driving engagement with the clutch 36 member 37 is thus placed in driving engagement with the shaft 7. Consequently shaft 1 will rotate relative to the member 37 thus moving the cam slots 45 and the cam humps 44 from their relative position shown in Figure 16 to the relative position shown in said Figure 17. This will result in causing the member 46 against the action of spring 48 to shift toward the left in Figure 1 so that the left hand end of the member 46 will move into frictional engagement with the flange 47. In this manner therefore is the tapered clutch part 40 of the member 42 caused to move out of frictional engagement with the clutch surface 41 of the gear 2 thus interrupting the driving engagement between shaft 1 and gear 2.

From the above it will be apparent that the cam humps 44 cooperating with the cam notches 45 when the cam humps 44 are in the position shown in Figure 17 serve to positively lock the part 46 of the member 42 between the flange 47 and the flange part 37a of the member 37 to the end that rotation of the member 42 with the shaft 1 is transmitted to the member 37.

Member 37 being thus, and in this manner placed in driven engagement with shaft 1 drive directly from shaft 1 will be transmitted through the member 42, the member 37, clutch element 36 integral with the member 37, and clutch 33 now in positive engagement with the clutch element 36, to the shaft 7. Thus is shaft 7 placed in direct driven engagement with shaft 1.

For use with the invention there is provided any suitable indicator, the same being denoted by the reference character I. The specific structural details of the indicator I are immaterial and are not of the essence of the invention, and therefore of this indicator there is shown but a dial D having on one face thereof the numerals 1, 2 and 3 to indicate respectively first, second and third speeds. Also the dial is provided with the letter R to indicate reverse speed. Further, of the indicator I there is also shown an index N adapted to be read against the numerals and the letter on the dial D, and this index is driven from a gear 22 through the medium of a gear 22a and flexible shafting 22b.

It will thus be apparent that when, for example the alined ribs 29 on the disk 26 come into engagement with the alined projections 30 on the innermost ring 17 incidental to effecting a direct driving engagement between the shafts 1 7, index N will have moved opposite to the numeral 3 on the dial D. Thus by reading the indicator the operator will know when this engagement of ribs 29 with the projections 30 on the innermost ring 17 has been effected. As soon as this result is so indicated by the indicator I the operator will then manipulate switch S to open the circuit through the motor and through the electro-magnetic operating device O whereupon the motor M will be caused to stop immediately, with the result that the said disk 26 will come to rest before its ribs 29 come into engagement with the projections 30 on any of the other of the rings 17.

A change of speed is effected in substantially the same manner, it being apparent that when a desired speed is obtained the operator, as before mentioned, closes the switch through the motor M for driving shaft 24 to thereby set the disk 26 in motion. When the ribs 29 on this disk come into engagement with the projections on the proper ring 17, the operator will be so apprised by reading the indicator I at which time he will then interrupt the circuit to the motor by opening the switch S. As previously explained, when the ribs 29 are thus brought into engagement with the projections 30 on the proper ring 17 the latter will be axially shifted for shifting the proper tubular member 15 to thereby engage the proper clutch element 14 with its associated speed gear 9.

A reverse speed is also obtained in substantially the same manner, as is thought to be apparent from the above. To clear the transmission, the operator closes the switch S' which may be suitably located adjacent to the aforementioned switch S.

Closing of the switch S' will complete the circuit through the reversing field of the motor M as well as through the electro-magnetic brake operating device O. Motor M will thus be driven in a reverse direction, and drive from the motor M is transmitted to the index N through gearing G, shaft 24, gear 22, gear 22a, and shafting 22b. As the index N moves in the anti-clockwise direction an arm a on the shaft of the index N moves therewith and into engagement with the spring contact of a switch C for moving said spring contact of the switch out of engagement with the fixed contact of said switch thereby breaking the circuit through the motor M when the index N has returned to its normal or what may be termed low speed indicating position.

Having thus described the invention, what is claimed as new is:

1. In a change speed transmission, alined driving and driven shafts, and clutch means for placing the driving shaft into and out of driving engagement with said driven shaft, said clutch means including a clutch sleeve disposed concentric to the adjacent ends of the alined shafts, said end of the driving shaft having a fixed collar thereon and arranged within said clutch sleeve, inter-engaging clutch means on the driven shaft and said clutch sleeve for placing the clutch sleeve in driving engagement with the driven shaft, and means on the mentioned end of the driving shaft and on said clutch sleeve responsive to a relative rotation between the driving shaft and the clutch sleeve and cooperable with said fixed collar to coact with said collar and said clutch sleeve to transmit drive to said clutch sleeve from the driving shaft when said clutch sleeve is in driving engagement with the driven shaft.

2. In a change speed transmission of the character described, alined driving and driven shafts, a clutch sleeve disposed about the adjacent ends of said shafts, inter-engaging clutch means on said sleeve and the driven shaft for placing the sleeve in driving engagement with the driven shaft, a member mounted on the driving shaft for rotation therewith and for axial movement relative thereto within said clutch sleeve, and coacting means on said member, on said clutch sleeve, and on said driving shaft, and responsive to a rotative movement of the clutch sleeve relative to the driving shaft to provide a connection between said driving shaft and the clutch sleeve when said clutch sleeve is in driving engagement with the driven shaft for driving the latter from the driving shaft.

3. In a change speed transmission of the character described, alined driving and driven shafts, a clutch sleeve disposed about the adjacent ends of said shafts, said clutch sleeve being provided in the end thereof circumjacent the driven shaft with a clutch element, a fixed clutch element on the driven shaft, and disposed at one side of the first named clutch element, a sliding clutch element on the driven shaft at the side of the first clutch element opposite to the second named clutch elements and cooperable with the first and second named clutch elements for placing the clutch sleeve in driving engagement with said driven shaft, and coacting means on the driving shaft and on the clutch sleeve responsive to a relative rotation of the driving shaft and sleeve to place said driving shaft in driving engagement with the clutch sleeve when the latter is in driving engagement with the driven shaft.

4. In a change speed transmission of the character described, alined driving and driven shafts, a clutch sleeve disposed about the adjacent ends of said shafts, an internal clutch element fixed within one end of said clutch sleeve and disposed circumjacent the driven shaft, a fixed clutch element on the driven shaft cooperable with and disposed at one side of the first named clutch element, a sliding clutch element on the driven shaft and disposed at the side of the first named clutch element opposite to the second named clutch element and cooperable with the first and second named clutch elements for placing the clutch sleeve in driving engagement with the driven shaft, a member mounted on the driving shaft for rotation therewith and for axial movement relative thereto internally of the clutch sleeve, and coacting means on the driving shaft and said member on the one hand, and on said clutch sleeve and said member on the other hand responsive to a relative rotation between said driving shaft and said clutch sleeve for transmitting drive from the driving shaft to the clutch sleeve when the latter is in driving engagement with the driven shaft.

5. In a change speed transmission of the character described, alined driving and driven shafts, a clutch sleeve disposed about the adjacent ends of said shafts, co-acting clutch means on said sleeve and on the driven shaft for placing said sleeve in driving engagement with the driven shaft, said driving shaft having a fixed collar on an end thereof internally of said clutch sleeve, and said clutch sleeve having an end thereof disposed circumjacent the driving shaft provided with an inturned flange, cam humps on the inner side of said flange, a member mounted on the driving shaft for rotation therewith and for axial movement relative thereto internally of the clutch sleeve, said member having a diametrically enlarged portion provided on one side thereof with notches complemental to said cam humps, a spring member disposed between said collar and the diametrically enlarged portion of said member and acting on said member to normally urge the latter in a direction away from said collar, and said cam humps adapted to act on the diametrically enlarged portion of said member at the notched side thereof in opposition to said spring for binding the enlarged portion of said member between said collar and the cam humps for placing said driving shaft in driving engagement with the clutch sleeve when the latter is in driving engagement with the driven shaft.

ROBERT E. LEWIS.